(12) United States Patent
Fredriksson et al.

(10) Patent No.: US 7,767,337 B2
(45) Date of Patent: *Aug. 3, 2010

(54) BIPOLAR BATTERY AND A BIPLATE ASSEMBLY

(75) Inventors: Lars Fredriksson, Täby (SE); Neil Puester, Aurora, CO (US)

(73) Assignee: Nilar International AB, Taby (SE)

( * ) Notice: Subject to any disclaimer, the term of this patent is extended or adjusted under 35 U.S.C. 154(b) by 796 days.

This patent is subject to a terminal disclaimer.

(21) Appl. No.: 10/243,693

(22) Filed: Sep. 16, 2002

(65) Prior Publication Data

US 2003/0072998 A1     Apr. 17, 2003

(30) Foreign Application Priority Data

Sep. 20, 2001     (SE)     ................................ 0103135

(51) Int. Cl.
*H01M 6/48*     (2006.01)
(52) U.S. Cl. ................... 429/210; 429/57; 429/154
(58) Field of Classification Search ................. 429/210, 429/6, 57, 89, 154
See application file for complete search history.

(56) References Cited

U.S. PATENT DOCUMENTS

| 4,008,099 | A |   | 2/1977 | Lindström | |
|---|---|---|---|---|---|
| 5,254,415 | A | * | 10/1993 | Williams et al. | 429/153 |
| 5,264,305 | A |   | 11/1993 | Charkey | |
| 5,344,723 | A |   | 9/1994 | Bronoel et al. | |
| 5,585,209 | A |   | 12/1996 | Feldstein | |
| 5,618,641 | A | * | 4/1997 | Arias | 429/210 |
| 5,688,615 | A | * | 11/1997 | Mrotek et al. | 429/210 |
| 2005/0106456 | A1 | * | 5/2005 | Puester et al. | 429/185 |
| 2005/0260493 | A1 | * | 11/2005 | Frederiksson et al. | 429/210 |

FOREIGN PATENT DOCUMENTS

| JP | 02-177268 | 7/1990 |
|---|---|---|
| JP | 04-095341 | 3/1992 |
| JP | 2000-251858 | 9/2000 |
| JP | 2001-185113 | 7/2001 |
| WO | 94/29923 | 12/1994 |
| WO | 98/05081 | 2/1998 |

* cited by examiner

*Primary Examiner*—Tracy Dove
(74) *Attorney, Agent, or Firm*—Capitol City TechLaw

(57) ABSTRACT

The present invention relates to a bipolar battery having at least two battery cells comprising: a negative end terminal, a positive end terminal and at least one biplate assembly arranged in a sandwich structure between the negative and positive end terminals. The battery also comprises a separator, with electrolyte, arranged between each negative and positive electrode forming a cell. An inner barrier of a hydrophobic material is arranged at least around one electrode on a first side of the biplate. An outer sealing, e.g. a frame, is provided around the edge of each biplate assembly and each end terminal and a hole is arranged through each biplate interconnecting each cell with adjacent cell(s) to create a common gas space for all cells in the battery. The invention also relates to a biplate assembly.

18 Claims, 3 Drawing Sheets

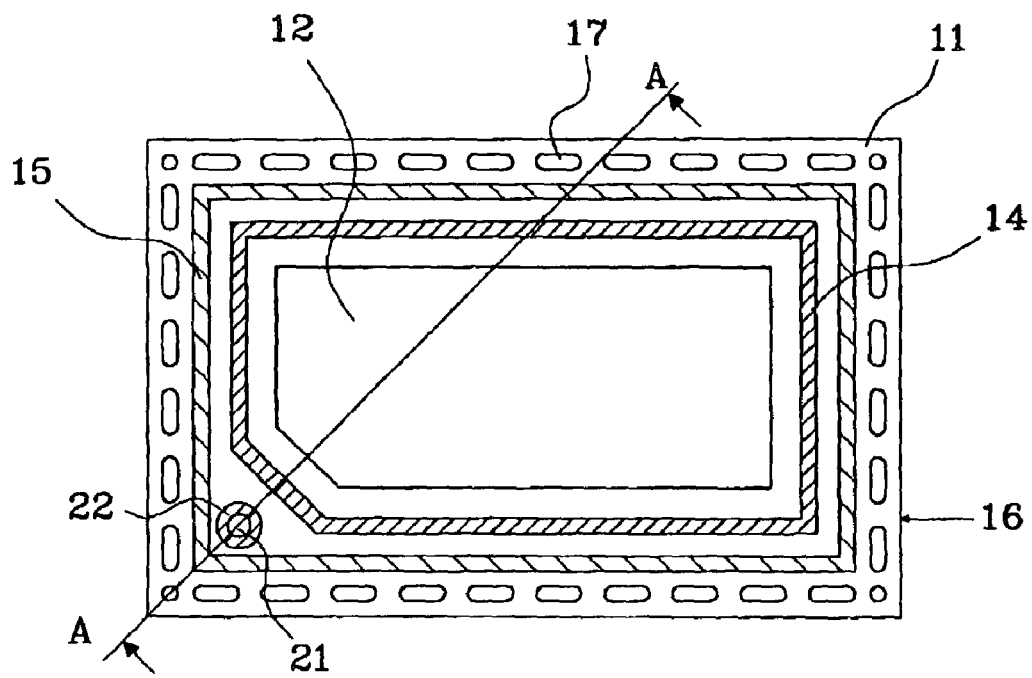
Fig. 1
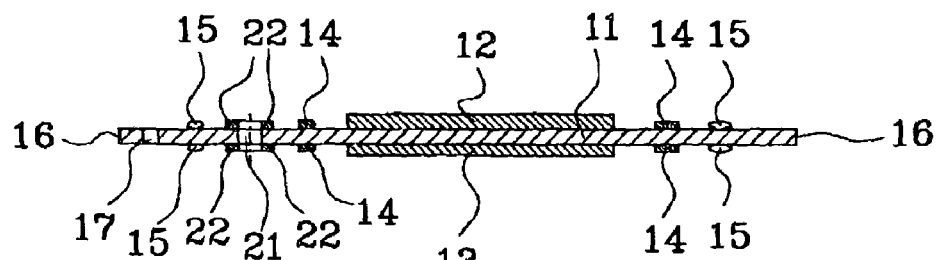
Fig. 2 (A-A)
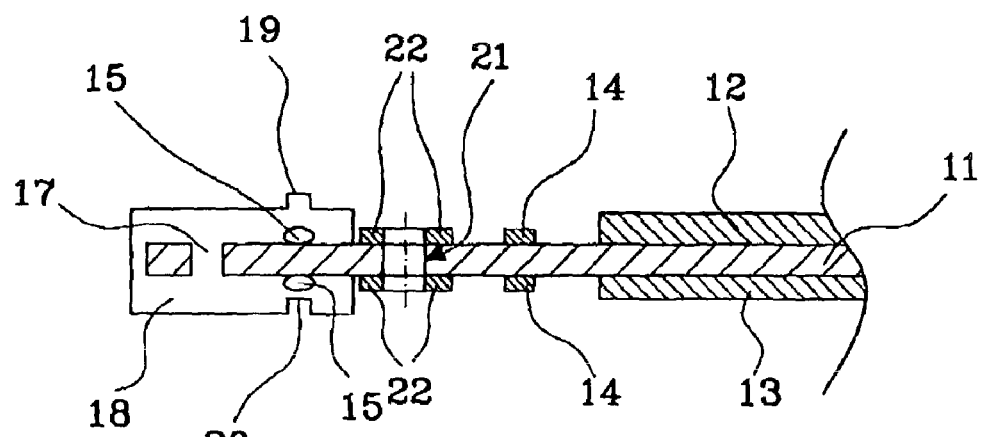
Fig. 3

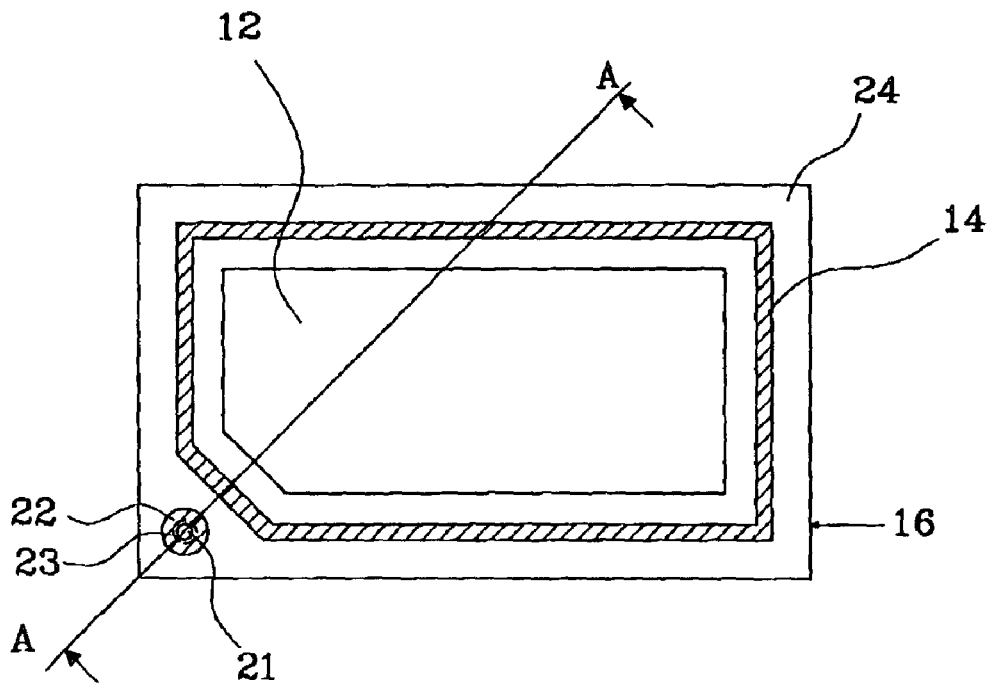
Fig. 4
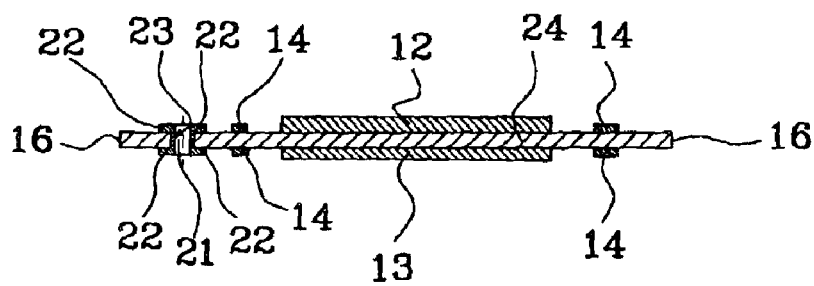
Fig. 5 (A-A)
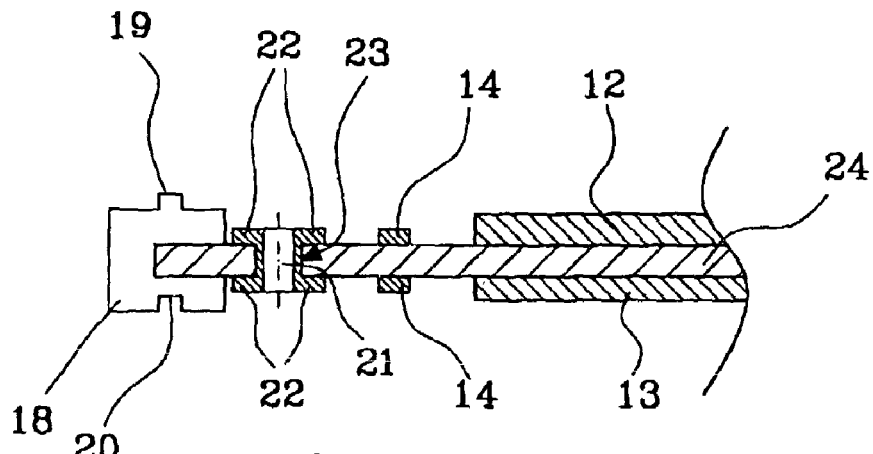
Fig. 6

BIPOLAR BATTERY AND A BIPLATE ASSEMBLY

TECHNICAL FIELD

The present invention relates to a bipolar battery comprising a pressure relief means. The invention also relates to a biplate.

BACKGROUND TO THE INVENTION

In theory, bipolar batteries can be used to improve battery energy storage capacity on a weight and volume basis, to reduce packing weight and volume, to provide stable battery performance and low internal resistance.

A bipolar battery construction comprises an electrically conductive bipolar layer, so called biplate, that serves as electrical interconnection between adjacent cells in the battery as well as a partition between the cells. In order for the bipolar construction to be successfully utilized, the biplate must be sufficiently conductive to transmit current from cell to cell, chemically stable in the cell's environment, capable of making and maintaining good contact to the electrodes and capable of being electrically insulated and sealable around the boundaries of the cell so as to contain electrolyte in the cell.

These requirements are more difficult to achieve in rechargeable batteries due to the charging potential that can accelerate corrosion of the biplate and in alkaline batteries due to the creep nature of electrolyte. Achieving the proper combination of these characteristics has proven very difficult. For maintenance-free operation it is desirable to operate rechargeable batteries in a sealed configuration. However, sealed bipolar designs typically utilize flat electrodes and stacked-cell constructions that are structurally poor for containment of gases present and generated during cell operation. In a sealed construction, gases generated during charging need to be chemically recombined within the cell for stable operation. The pressure-containment requirement creates additional challenges in the design of a stable bipolar configuration.

Battery manufacturers have not developed bipolar batteries commercially because a working seal design has always been a problem. The vast majority of development work to date has been strictly related to lead/acid technology. The seal is difficult to achieve due to the galvanic creepage of the electrolyte, the corrosive conditions and the heat and pressure generated by the battery. Other manufacturers have tried to make leak-proof seals, and use rigid approaches that ultimately fail due to thermal expansion and pressure changes. In the subject disclosure, the pressure created in each battery cell may be vented through a pressure vessel if the pressure exceeds a predetermined level.

New requirements in the field of transportation, communications, medical and power tools are generating specifications that existing batteries cannot meet. These include higher cycle life and the need for rapid and efficient recharges.

NiMH systems are seen as the alternative to meet cycle life, but costs for existing conventional fabrication are too high.

In the recharge of an ideal battery, the energy would be stored with 100% efficiency, and the recharge should terminate when the 100% state was reached. in most batteries, this can be determined by knowing the relationship between battery temperature and the desired final voltage. Because batteries are not 100% efficient, it may require 104% (for new lead acid batteries) to achieve 100% recharge. Lead acid batteries exhibit a fairly sharp increase in cell voltage as they approach full charge. Power supplies can be set to sense a voltage, and terminate the charge at that point. Alternatively, when a set voltage is reached, the power supply can be programmed to supply a limited additional amount of charge. Nickel Cadmium and Nickel Metal Hydride cells have a different characteristic: when approaching full charge, the voltage begins to decrease.

Charge voltage is always higher than the cell open circuit voltage, because it must overcome resistive losses, which are additive to the required voltage to recharge the cell. The amount of higher voltage is proportional to the rate of recharge. Nickel cells accept current at elevated temperatures at lower voltages. The problem arises when trying to recharge fully, or recharge electrodes that are not uniformly discharged.

The portions of the electrodes with lower resistance or that are fully charged will begin overcharging before the rest of the cell is charged. These areas will convert the charge energy to oxygen via electrolysis. The oxygen then recombines on the negative electrode producing an equivalent amount of heat, and the temperature of the cell increases. The temperature increase will be greater in the area that is overcharged and recombining, so increasing amounts of the recharge will flow through the warmer areas. While this may damage the cell in time, it prevents the ability to determine that a battery is fully charged based upon its voltage.

In U.S. Pat No. 5,344,723 by Bronoel et al., a bipolar battery is disclose having a common gas chamber, which is created by providing an opening through the biplate (conductive support/separator). The opening is also provided with a hydrophobic barrier to prevent passage of electrolyte through the hole. Although the problem with pressure differences between the cells is solved, there are still a disadvantage with the described battery. The outer sealing around the edge of each biplate still has to be fluid-tight, which is very difficult to achieve. If the outer sealing is not fluid-tight, the electrolyte, contained in the separator between the electrodes, may migrate from one cell to another.

There is a need for a battery that is easy to manufacture at affordable prices, and that are safe to handle during charge and discharge procedures.

SUMMARY OF THE INVENTION

The object of the present invention is to provide a bipolar battery, preferably a bipolar NiMH battery, that has improved sealing properties compared to prior art bipolar batteries.

This object is achieved by a bipolar battery and a biplate assembly as defined by the appended claims.

An advantage with the present invention is that the bipolar battery is easier to manufacture compared to prior art bipolar batteries.

Another advantage is that the cost for manufacturing the bipolar battery and the biplate assembly is greatly reduced, while maintaining or even improving the operating properties of the bipolar battery.

Further objects and advantages of the present invention will be apparent to those skilled in the art from the following detailed description of the disclosed bipolar electrochemical battery and the biplate assembly.

BRIEF DESCRIPTION OF THE DRAWINGS

The different embodiments shown in the appended drawings are not to scale or proportion, but exaggerated to point out different important features for the sake of clarity.

FIG. 1 shows a planar view of a first embodiment of a biplate assembly according to the invention.

FIG. 2 shows a cross-sectional view along A-A in FIG. 1.

FIG. 3 shows a cross-sectional partial view of a biplate assembly with a molded frame.

FIG. 4 shows a planar view of a second embodiment of a biplate assembly according to the invention.

FIG. 5 shows a cross-sectional view along A-A in FIG. 4.

FIG. 6 shows a cross-sectional partial view of a second embodiment of a biplate assembly with a molded frame.

DETAILED DESCRIPTION OF PREFERRED EMBODIMENTS

Figure 7:
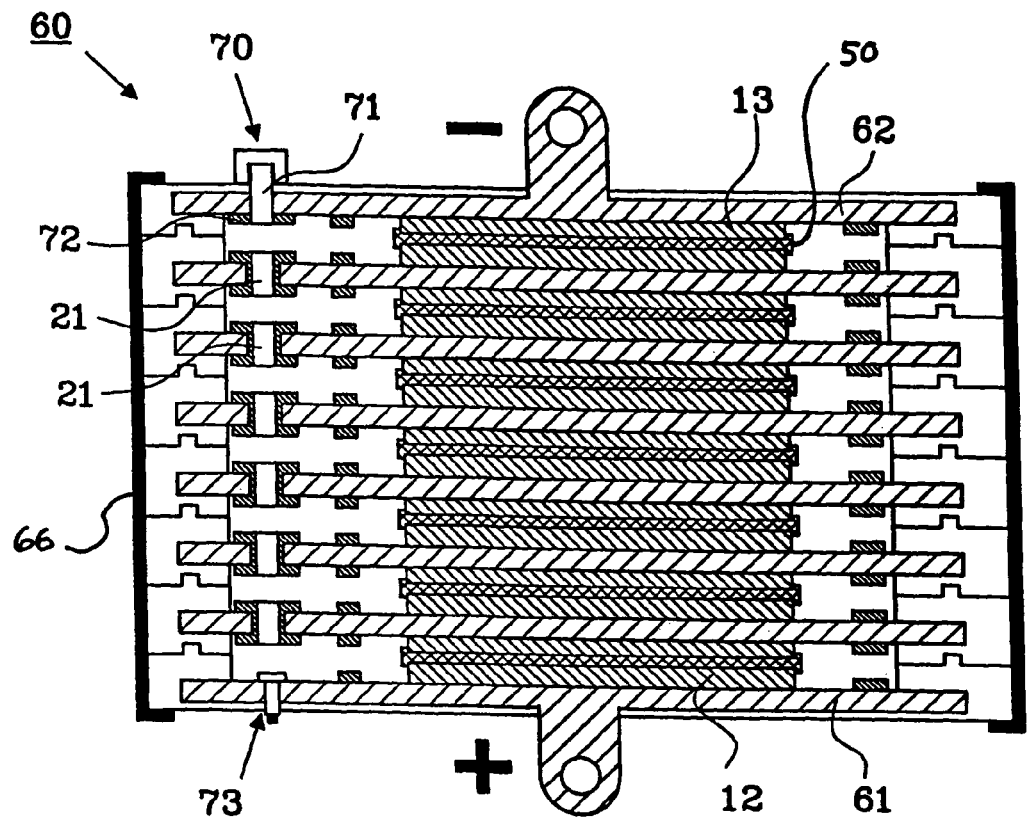
FIG. 7 shows a bipolar battery according to the present invention.

The major benefits of the bipolar battery design are simplicity and low resistance losses. The parts count of the battery is relative low, consisting only of end plates and biplates, with appropriate assembly and sealing components. Batteries of a desired voltage are constructed by stacking the required number of biplates. The electrical connections between the cells are made as the battery is stacked, since each biplate is electrically conductive and impervious to electrolyte.

With the terminals at each end, the flow of current is perpendicular to the plate, which ensures uniform current and voltage distribution. Since the current path is very short the voltage drop is significantly reduced.

Bipolar batteries will also have significantly reduced weight, volume and manufacturing costs due to elimination of components and the manufacturing approach.

The major problem with bipolar batteries that has not been commercially solved before is obtaining a reliable seal between cells within the bipolar battery. Another problem is to avoid overcharging the battery and thus generate a high pressure within the cell that may cause the battery to explode. A solution to these problems are presented below.

The seal on a cell is of extreme importance for all types of batteries, and bipolar batteries are no exception. Individual cells contain the active materials (for NiMH batteries it is Nickel Hydroxide positive and metal Hydride Hydrogen storage alloy negative, respectively), separator and electrolyte. The electrolyte is required for ion transport between the electrodes. The best designs, optimized for longevity, weight and volume, require recombination of gasses.

Batteries always produce gasses as they are charged. The gassing rate increases as the battery nears full charge, and reaches maximum when fully charged. The gasses which are produced are oxygen and hydrogen.

Batteries considered for power applications have thin electrodes. Long life with minimum weight and volume are required attributes, which requires a sealed construction.

Oxygen will recombine rather rapidly, so batteries are designed so oxygen will be the first gas generated if the cell is overcharged or overdischarged. This requires two actions:

1) Overbuild the negative active material, generally by 30%, to ensure that the positive electrode, which will gas oxygen, will be the first to gas.

2) Provide for gas passage from the positive to the negative, where the oxygen will recombine. The gas passages are obtained by controlling the amount of electrolyte within the pores of the electrode and through the separator. All surfaces of the electrode must be covered by a thin layer of electrolyte for the transport of ions, but the layer must be thin enough to permit gas diffusion through the layer, and must allow gas passages throughout the active layers and the separator.

The negative electrode would gas hydrogen if overcharged. Because hydrogen does not recombine quickly, pressure would build up within the cell. The oxygen recombination effectively discharges the negative at the same rate it is being charged, thus preventing overcharge of the negative.

The surface area of the active material, combined with the uniform voltage distribution of the bipolar design, enhances rapid recombination.

The bipolar approach will ensure that the voltage drop across the active material will be uniform in all areas, so that the entire electrode will come up to full charge at the same time. This will eliminate the major problem in conventional constructions, where parts of an electrode are overcharging and gassing while other (remote) areas of the electrode are not yet fully charged.

The cells in regular batteries are sealed to contain the electrolyte both for proper performance of the cells, and to prevent electrolyte paths between adjacent cells. The presence of electrolyte paths between cells will allow the electrolyte connected cells to discharge at a rate that is determined by the resistivity of the path (length of path and cross section of path). The seals on bipolar batteries are more important because the electrolyte path is potentially much shorter. It should be noted that an important feature of this disclosure is the use of a horizontal electrolyte barrier to significantly increase the length of the potential path. An additional concern, is the amount of heat generated by operation of the cell. Depending on the magnitude of heat generated, the design must be able to reject the heat and maintain a safe operating temperature.

If an electrolyte path is developed between cells, a small intercell leakage can be overcome by the periodic full charging of the battery. The battery may be overcharged by a set amount and at a low rate. The low rate would allow fully charged cells to recombine gasses without generating pressure and dissipate the heat from the recombination/overcharge. Cells that have small intercell electrical leakage paths would become balanced.

The flow of heat in a bipolar cell will occur in a radial direction, and in fact end plates is preferably somewhat insulated, to ensure that they operate at the same temperature as the rest of the battery.

It is rarely necessary that a battery be fully charged to achieve its useful function. Batteries are routinely overspecified and overbuilt. If an operation requires 50 AH (Ampere Hours), the requirement is usually specified at least 10% higher. Since battery lose capacity over their lifetime, the capacity of a new battery is increased by the expected loss, resulting in possibly a 70 AH requirement for a new battery in this example. The manufacturer will probably have a median design target of 75 AH to allow for variations in the manufacturing process. Much of this overbuild is to compensate for the life capacity degradation that is caused by the overcharging.

FIG. 1 is a planar view and FIG. 2 is a cross sectional view (along A-A in FIG. 1) of an embodiment of a biplate assembly. Normally a biplate assembly requires a frame to makeup the individual cells within the battery, but for the sake of clarity the frame is omitted in FIGS. 1 and 2. However, a bipolar battery may be constructed from biplate assemblies without a frame as described in connection with FIG. 8.

The biplate assembly comprises a biplate 11, preferably made from Nickel or Nickel plated steel. A positive electrode 12 and a negative electrode 13 are attached to each side, respectively, of the biplate 11. Each electrode is arranged to cover only a central portion of the side of the biplate 11 to leave space for implementing the sealing and heat conducting means. An electrolyte barrier 14, preventing electrolyte leakage, is provided on both sides of the biplate between the electrode and an elastomer 15. The purpose of the elastomer 15 is to create a sealing between the interior and the exterior of the battery. The elastomer is provided between the barrier 14 and the edge 16 on both sides of the biplate 11.

A hole 21 through the biplate is provided between the ring of elastomer 15 and the electrolyte barrier 14. The function of this hole 21 will become more apparent in connection with the description of FIG. 3. A second electrolyte barrier 22 is provided around the hole 21 on both sides of the biplate 11 to eliminate an electrolyte leakage path between adjacent cells.

A series of holes 17 through the biplate 11 are also provided around the perimeter between the elastomer 15 and the edge 16. The holes 17 in the biplate 11 is described in more detail in connection with FIG. 3.

The electrodes 12, 13 may be attached to the biplate 11 in many ways, but preferably the electrodes are manufactured directly onto the biplate by using pressed powder, as is disclosed in the PCT application PCT/SE02/01359, with the title "A method for manufacturing a biplate assembly, a biplate assembly and a bipolar battery" by the same applicant. By using the method of pressing powder directly onto the biplate, thin electrodes having less active material may be manufactured.

The shape of the biplate is preferably rectangular to maximize the useful area of the biplate and to better use the biplate for heat conductive purposes. The maximum heat path will be limited to half the length of the shortest side of the rectangle. In this embodiment one corner is cut off to provide space for the hole 21.

The electrolyte barriers 14 and 22 are made from a suitable hydrophobic material, such as a flouropolymer or similar materials. The hydrophobic material may be applied to the biplate as a liquid or solid material and then cured in place, which will bond the barrier to the biplate in an efficient way to prevent electrolyte leakage between cells.

FIG. 3 shows a cross sectional partial view of a complete biplate assembly, including the frame 18. The frame 18 encompass, in this embodiment, the ring of elastomer 15 on both the negative and positive side of the biplate 11. The frame 18 may have elastic properties allowing it to be compressed when several biplate assemblies 10 are stacked on top of each other to provide good sealing properties of the cells within the battery. Tie rods (not shown) may be applied around the perimeter of the battery to provide the appropriate pressure needed to achieve the sealing of the cells.

On the other hand if the frame 18 is not made from an elastic material, a final sealing material, such as epoxy, have to be used to provide the sealing between the endplates and the biplate assemblies.

The frame 18 is provided with guiding means to make it easier to align stacked biplate assemblies. These guiding means comprises a tongue 19 arranged on a first side of the frame, e.g. the side corresponding to the positive side, and a corresponding groove 20 on a second side, e.g. the side corresponding to the negative side. The tongue 19 and the groove 20 are positioned directly above the ring of elastomer 15 on each side of the biplate, respectively. The elastomer is preferably more elastic than the material of the frame 18.

In the case when the frame 18 is not elastic, the tongue 19 and the groove 20 will also interact to provide an interim seal to prevent the final assembly sealing material, such as epoxy, from entering the cell when applied.

The holes 17 through the biplate 11 is filled with the same material making up the frame 18, which preferably is achieved by injection molding the frame 18, but other techniques may be used. The advantage with providing holes 17 and filling them with molded material is that the outer seal, i.e. the frame 18 and the encompassed ring of elastomer 15, easily may follow any changes of the size of the biplate. The size of the biplate 11 may change due to heat developed during charging or discharging of the electrodes. The elastic properties of the outer seal makes it possible to follow the changes without a breach in the sealing between adjacent cells.

Preferably, the frame 18 does not extend over the hole 21 in the biplate 11. The hydrophobic material 22 is positioned around the hole on both sides of the hole 21 in the biplate. The purpose of the hydrophobic material is to prevent the creation of an electrolyte leakage path through the hole 21 between adjacent cells in the battery. When several biplate assemblies are stacked upon each other, as described in connection with FIG. 7, a common gas space will be created which will eliminate the pressure difference between the cells in a bipolar battery.

The ring of elastomer 15 does not have to be implemented on the biplate assembly. The interconnection through the hole 21 will equalize the pressure of adjacent cells in the battery, thereby equalizing the pressure inside the battery.

FIG. 4 is a planar view and FIG. 5 is a cross sectional view (along A-A in FIG. 4) of a second embodiment of a biplate assembly, where the frame is omitted for the sake of clarity.

The biplate assembly comprises a biplate 24, preferably made from Nickel or Nickel plated steel. A positive electrode 12 and a negative electrode 13 are attached to each side, respectively, of the biplate 24. Each electrode is arranged to cover only a central portion of the side of the biplate 24 as described in connection with FIGS. 1 and 2. An electrolyte barrier 14, preventing electrolyte leakage paths, is provided on both sides of the biplate between the electrode and the edge 16 of the biplate 24.

A hole 21 through the biplate is provided between the edge 16 and the electrolyte barrier 14. The function of this hole 21 is described in connection with FIG. 3. A second electrolyte barrier 22 is provided around the hole 21 on both sides of the biplate 24 to eliminate an electrolyte leakage path between adjacent cells. An additional third electrolyte barrier 23 is also provided on the inner wall surface of the hole 21.

In this embodiment no holes are provided around the perimeter of the biplate 24. The ring of elastomer present in the first embodiment (see FIGS. 1-3) is also omitted.

The size of the biplate 24 may be reduced compared to the biplate 11 of the first embodiment, but the size of the electrodes are the same with one corner cut off to provide space for the hole 21.

The electrolyte barriers 14, 22 and 23 are made from a suitable hydrophobic material, such as a flouropolymer or similar materials as described above. The addition of the third barrier 23 will further decrease the possibility that an electrolyte path is created between adjacent cells in the battery.

FIG. 6 shows a cross sectional partial view of a complete biplate assembly, including the frame 18. The frame 18 encompass, in this embodiment, only the edge of the biplate 24 and a part of each side of the biplate. The frame 18 may have the same properties as described in connection with FIG. 3

The frame 18 is provided with guiding means to make it easier to align stacked biplate assemblies. These guiding means comprises a tongue 19 arranged on a first side of the frame, e.g. the side corresponding to the positive side, and a corresponding groove 20 on a second side, e.g. the side corresponding to the negative side.

Preferably, the frame 18 does not extend over the hole 21 in the biplate 24. The hydrophobic material is positioned around the hole 21 on both sides, i.e. the second barrier 22, and on the inner wall surface of the hole 21, i.e. the third barrier 23. The purpose of the hydrophobic material is to prevent the creation of an electrolyte leakage path through the hole 21 between adjacent cells in the battery. The addition of the third barrier will further reduce the possibility to establish an electrolyte leakage path, as previously mentioned.

Although only one hole 21 through the biplate 11 and 24 has been described, it is obvious that a plurality holes may be provided through the biplate.

FIG. 7 shows a bipolar battery 60 in cross section having seven cells. The battery comprises a positive end terminal 61 and a negative end terminal 62, each having a positive electrode 12 and a negative 13 electrode, respectively. Six biplate assemblies are stacked on each other in a sandwich structure between the two end terminals 61, 62. A separator 50 is arranged between each adjacent positive 12 and negative 13 electrode making up a cell, the separator comprises an electrolyte and a predetermined percentage of gas passages, about 5% is a typical value for gas passages.

As can be clearly seen from the figure, all cells share a common gas space through the holes 21, only a few of these are numbered, provided between adjacent cells If an electrode in a cell starts to gas before the others, this pressure will be distributed through-out the whole common space.

If the pressure within the common space exceed a predetermined value, a pressure relief valve 70 will open to connect the common gas space with the ambient environment. The pressure relief valve 70 is arranged through one of the end terminals, in this example the negative end terminal 62 and comprises a feed-through 71 having a hydrophobic barrier 72 around the opening inside the common gas space.

Additionally, a pressure sensor 73 is also mounted through one of the end terminals, in this example the positive end terminal 61, to measure the actual pressure inside the battery cells. A sleeve 66 is arranged around the end terminals 61, 62 and the stacked biplate assemblies, to maintain an appropriate pressure on the structure to achieve a sealed housing.

Relief valves and pressure sensors are readily available to a man skilled in the arts and are not described in more detail.

Figure 8:
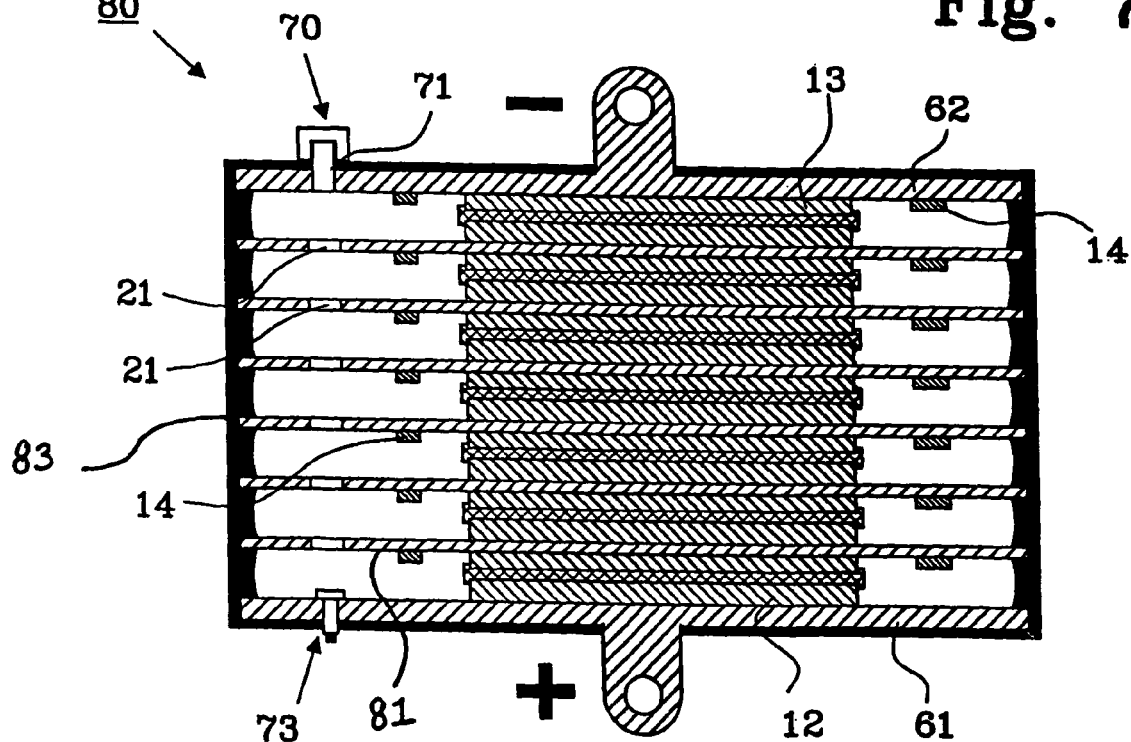
FIG. 8 shows an alternative construction of a bipolar battery according to the present invention.

FIG. 8 show an alternative construction of a bipolar battery 80 according to the invention, comprising a positive end terminal 61, a negative end terminal 62 and six stacked biplate assemblies. The construction of this battery differs from the battery described in connection with FIG. 7 in the following way. No hydrophobic barrier is present around the hole 21. Only one electrolyte barrier 14 is present around the negative electrode 13 on the negative side of each biplate 81, that will prevent passages of electrolyte from one cell to another through the hole 21. The electrolyte barrier 14 may naturally be arranged only around the positive electrode 12 instead of the negative electrode 13. An electrolyte barrier 14 may also be arranged around both the positive electrode 12 and the negative electrode 13, but one electrolyte barrier is enough to prevent passages of electrolyte from one from a positive electrode in one cell to a negative electrode in an adjacent cell. The electrolyte barrier 14 will also prevent passage of electrolyte around the edge 16 of each biplate 81 if a electrolyte barrier is present around both electrodes 12, 13 (not shown). Due to the fact that the electrolyte barrier 14 is arranged around at least one electrode, it is possible to use biplate assemblies without a frame to construct the bipolar battery 80. If no frame is necessary, the thickness of the biplate 81 may be reduced. Furthermore, an outer sealing being a continuous, coherent envelope, preferably comprising only of glass fibre and epoxy 83, is necessary to make a functional battery, since there is no need to make a gas seal between each cell. The hole 21 provided in the biplate will cause the pressure difference between adjacent cells to be zero.

The holes 21 provided in the biplates 81 will create a common gas chamber and, as described in connection with FIG. 7, and the electrolyte barrier 14 will prevent passages of electrolyte from one cell to another. Preferably, a pressure relief value 70, having a feed-through 71 in the negative terminal 62, is provided together with a pressure sensor 73 to monitor the pressure within the battery.

The invention claimed is:

1. A bipolar battery comprising:
a housing;
a negative end terminal;
a positive end terminal;
at least one biplate assembly situated between said negative and said positive end terminals, said at least one biplate assembly having a biplate with a negative side and a positive side, a negative electrode mounted on the negative side of the biplate, a positive electrode mounted on the positive side of the biplate, and at least one hole provided through said biplate to create a common gas space on the negative and the positive sides of said biplate;
an outer sealing provided around an edge of said at least one biplate assembly and said negative and said positive end terminals to provide said housing;
a barrier of a hydrophobic material provided on said biplate and surrounding an entire periphery of at least one of said negative electrode or said positive electrode; and
said at least one hole located between said barrier and said outer sealing.

2. The bipolar battery according to claim 1, wherein said barrier surrounds an entire periphery of said negative electrode.

3. The bipolar battery according to claim 2, further comprising a second barrier of hydrophobic material surrounding an entire periphery of said positive electrode.

4. The bipolar battery according to claim 1, wherein at least one of said negative end terminal or said positive end terminal is provided with a pressure relief valve to allow the common gas space to be connected to the ambient environment if the pressure in the common gas space exceeds a predetermined value.

5. The bipolar battery according to claim 1, wherein a pressure sensor is attached to at least one of said negative end terminal or said positive end terminal to monitor the pressure inside the common gas space.

6. The bipolar battery according to claim 1, wherein said outer sealing comprises a frame provided around the edge of said at least one biplate assembly and said negative and said positive end terminals to provide said housing.

7. The bipolar battery according to claim 1, wherein said outer sealing comprises a continuous, coherent envelope of material.

8. A biplate assembly comprising:
a biplate having a first side and a second side;
a positive electrode arranged on the first side of said biplate;
a negative electrode arranged on the second side of said biplate;
at least one hole provided through said biplate; and a barrier of a hydrophobic material provided on said biplate and surrounding an entire periphery of at least one of said positive electrode or said negative electrode;

said at least one hole located between said barrier and an edge of the biplate.

9. The biplate assembly according to claim 8, wherein said barrier is surrounds an entire periphery of said negative electrode.

10. The biplate assembly according to claim 9, further comprising a second barrier of hydrophobic material surrounding an entire periphery of said positive electrode.

11. The biplate assembly according to claim 8, further comprising a frame provided around the edge of the biplate.

12. The bipolar battery according to claim 1, wherein a plurality of said biplate assemblies are stacked together and situated between said negative and said positive end terminals.

13. The bipolar battery according to claim 12, further comprising a separator interposed between adjacent biplate assemblies.

14. The bipolar battery according claim 12, wherein the separator includes an electrolyte.

15. A biplate assembly comprising:
a biplate;
an electrode provided on said biplate; and
a barrier of a hydrophobic material provided on said biplate and surrounding an entire periphery of said electrode; and
at least one hole provided through said biplate.

16. The bipolar battery according to claim 1, wherein the biplate is comprised of nickel.

17. The biplate assembly according to claim 8, wherein the biplate is comprised of nickel.

18. The biplate assembly according to claim 15, wherein the biplate is comprised of nickel.

* * * * *